United States Patent [19]

Ishida

[11] Patent Number: 5,622,510
[45] Date of Patent: Apr. 22, 1997

[54] PC CARD ELECTRICAL CONNECTOR

[75] Inventor: Mitsuo Ishida, Tokyo, Japan

[73] Assignee: Hirose Electric Co., Ltd., Tokyo, Japan

[21] Appl. No.: 493,822

[22] Filed: Jun. 22, 1995

[30] Foreign Application Priority Data

Jun. 29, 1994 [JP] Japan ................................. 6-168646

[51] Int. Cl.⁶ .................................................. H01R 13/62
[52] U.S. Cl. ........................................... 439/160; 439/157
[58] Field of Search .................................. 439/152–160, 439/372

[56] References Cited

U.S. PATENT DOCUMENTS

| | | | |
|---|---|---|---|
| 4,952,161 | 8/1990 | Komatsu | 439/159 |
| 5,106,313 | 4/1992 | Billman et al. | 439/160 |
| 5,115,376 | 5/1992 | Nakajima | 439/160 |
| 5,147,211 | 9/1992 | Tondreault et al. | 439/160 |
| 5,299,089 | 3/1994 | Lwee | 439/159 |
| 5,324,204 | 6/1994 | Lwee | 439/159 |
| 5,499,925 | 3/1996 | Lwee | 439/157 |

*Primary Examiner*—David L. Pirlot
*Attorney, Agent, or Firm*—Kanesaka & Takeuchi

[57] ABSTRACT

A PC card electrical connector which includes a housing having at least upper and lower storage cavities for accepting PC cards (1) one for each storage cavity; at least upper and lower movable plates (2) disposed near the upper and lower storage cavities, respectively, each movable plate having at least one abutment member (2A) for abutment with a portion of the PC cards; at least upper and lower eject levers (5) rotatably supported by the housing in planes parallel to the PC cards and coupled at one end to the movable plates; at least upper and lower intermediate bars (6) coupled to the other end of the upper and lower eject levers, respectively, and movable along sides of the storage cavities; and an ejector (8, 9) for selectively engaging and pushing one of the upper and lower intermediate bars, thereby permitting operation of one of the eject levers to eject the desired PC card with ease and few errors.

7 Claims, 7 Drawing Sheets

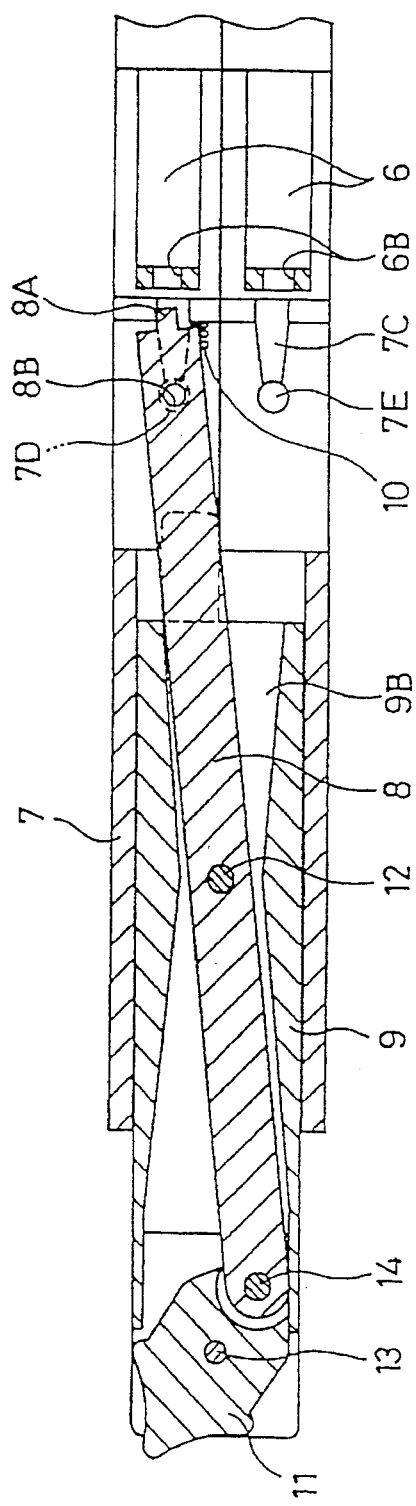
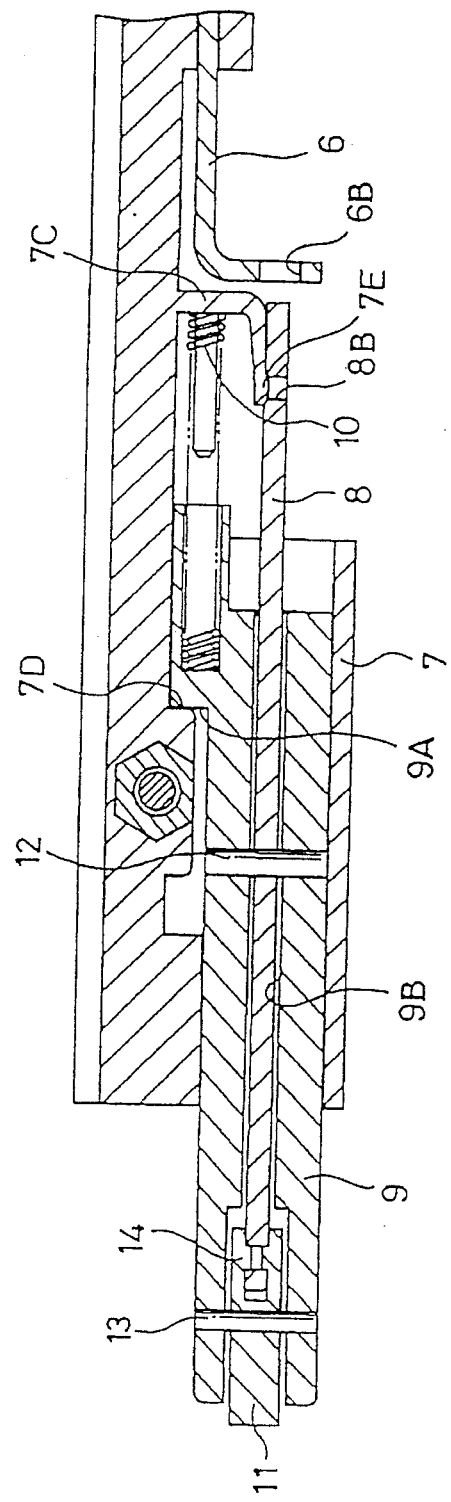
FIG. 4
FIG. 5

5,622,510

PC CARD ELECTRICAL CONNECTOR

BACKGROUND OF THE INVENTION

1. Field of the Invention

The present invention relates to PC card Electrical Connectors.

2. Description of the Related Art

Japanese UM patent application Kokai No. 4-133369 discloses a connector such as shown in FIG. 11. The connector includes a housing 51 having upper and lower storage cavities 53 for receiving a PC card 52 for each storage cavity as shown by broken line. A movable plate 54 is provided in each storage cavity 53 to receive the front portion of a PC card 52. Portions of the front edge of each movable plate 54 are bent to form abutment member 55 for abutment with the front end face of a PC card 52. A slot 56 extends in the longitudinal direction of the housing 51 to receive a shaft 57 of the housing 51 to which an eject lever 58 is pivoted. A slot 59 is formed in an end portion of the eject lever 58 for engagement with a projection 60 of the movable plate 54. The other end portion of the eject lever 58 projects from a side of the storage cavity 53 into an opening where it is coupled to a groove 61A of an eject bar 61. An ejector button 62 is coupled to the eject bar 61 near the opening of a storage cavity 53. The ejector button 62 is located near the rear end of a PC card 52 under the mated condition.

The ejector button 62 is located at a position shown by a solid line when a PC card is used. To remove the PC card, the ejector button 62 is depressed to a position shown by a broken line (see an arrow A) to rotate the eject lever 58, thereby moving the movable plate 54 in the forward direction. Thus, the PC card 52 is moved forwardly by the abutment members 55 of the movable plate 54 and can be removed from the storage cavity.

In the above connector, however, the ejector buttons are provided in the same number as that of PC cards. In addition, an identical ejector mechanism is provided for each PC card. In order to minimize the thickness of the connector, respective ejector mechanisms are made compact and closely stacked one upon another.

Consequently, it is frequent that wrong ejector buttons are depressed or it is difficult to push the desired ejector button.

SUMMARY OF THE INVENTION

Accordingly, it is an object of the invention to provide a PC card electrical connector which is easy to operate without errors and simple in structure.

According to the invention there is provided a PC card electrical connector which includes a housing having at least upper and lower storage cavities for accepting PC cards one for each storage cavity; at least upper and lower movable plates disposed near the upper and lower storage cavities, respectively, each movable plate having at least one abutment member for abutment with a portion of the PC cards; at least upper and lower eject levers rotatably supported by the housing in planes parallel to the PC cards and coupled at one end to the movable plates; at least upper and lower intermediate bars coupled to the other end of the upper and lower eject levers, respectively, and movable along sides of the storage cavities; and an ejector for selectively engaging one of the upper and lower intermediate bars, thereby permitting operation of one of the eject levers to eject the desired PC card with ease and few errors.

The ejector is switched to the position corresponding to the storage cavity which houses the PC card to be removed and then the ejector is depressed for removal of the PC card.

The ejector comprises an eject bar and an operation button rotatably coupled to the front end of the eject bar so that by changing the position of the operation button it is possible to switch the ejector.

PC cards are inserted into respective storage cavities in the same manner as in conventional connectors.

The above and other objects, features, and advantages of the invention will be more apparent from the following description when taken in conjunction with the accompanying drawings.

BRIEF DESCRIPTION OF THE DRAWINGS

FIG. 4 is a sectional view taken along line IV—IV of FIG. 1;

FIG. 5 is a sectional view taken along line V—V of FIG. 3;

DESCRIPTION OF THE PREFERRED EMBODIMENT

Figure 1:
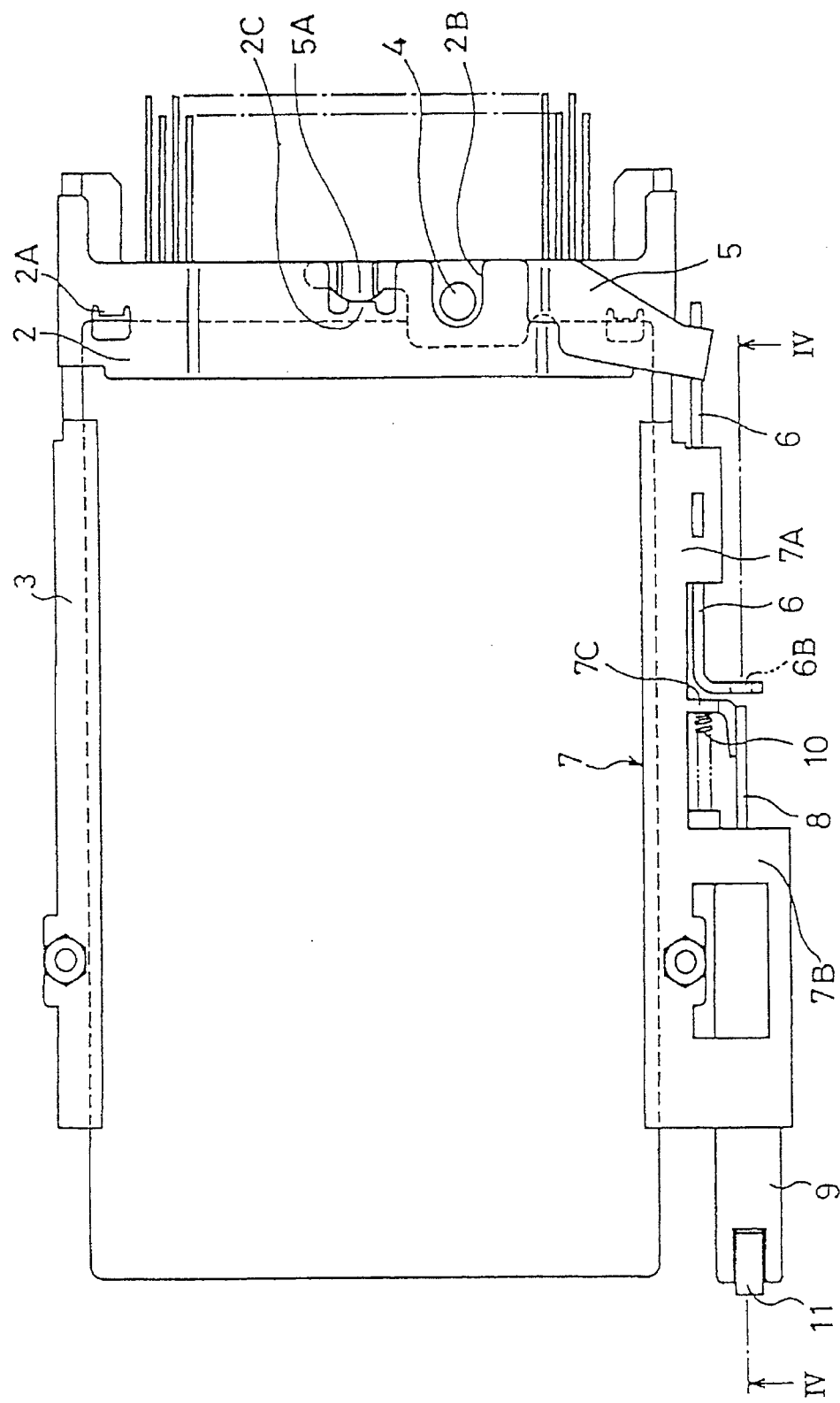
FIG. 1 is a top view of an electrical connector according to an embodiment of the invention.
Figure 2:
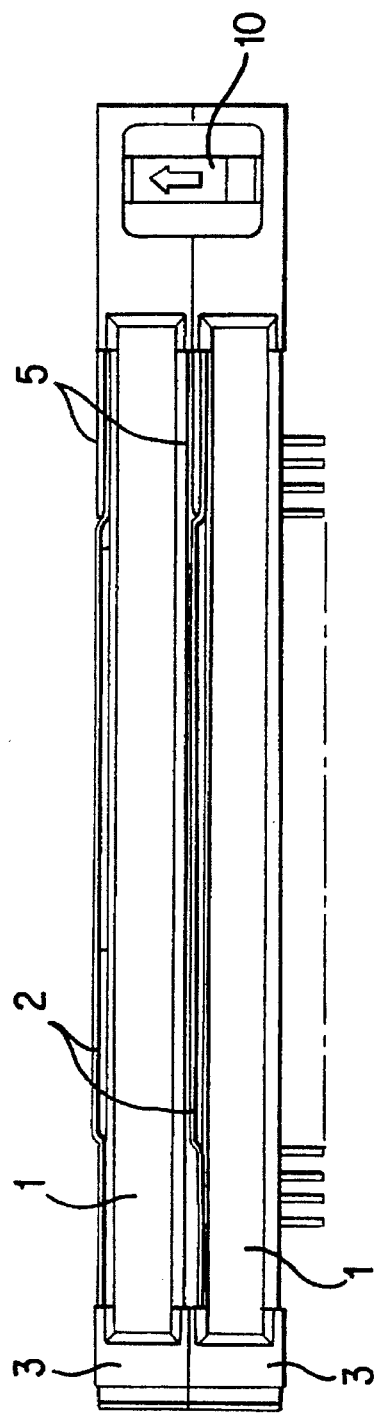
FIG. 2 is a front view of the electrical connector.
Figure 3:
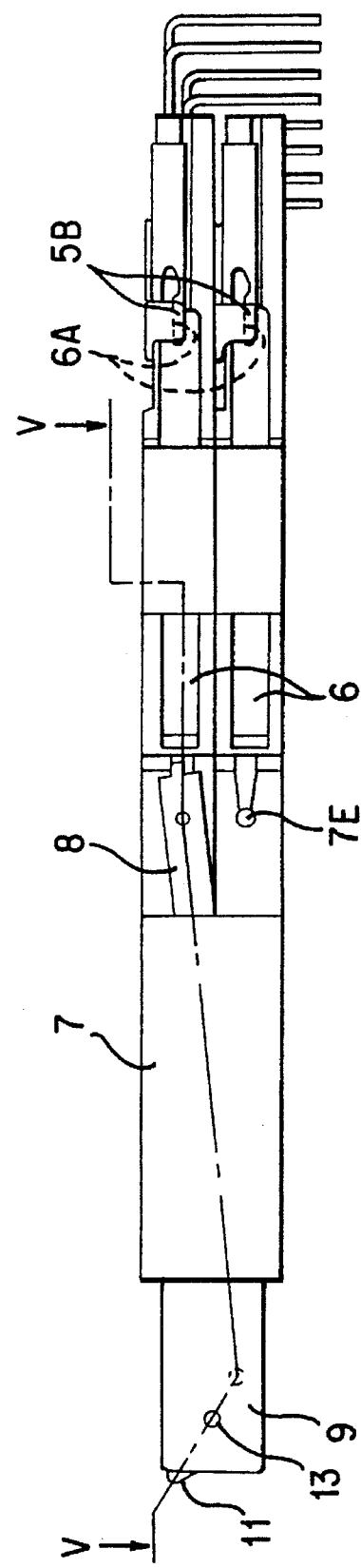
FIG. 3 is a side view of the electrical connector.

FIGS. 1–3, PC cards 1 are housed in storage cavities of a housing, and the front end portions thereof are received by movable plates 2. The upper and lower storage cavities are stacked one upon another in parallel planes to receive PC cards one for each storage cavity. The movable plate 2 and an eject lever 5 are provided for each storage cavity.

Each movable plate 2 is disposed near the rear end of the storage cavity and is movable in the longitudinal direction of the housing. A pair of guides 3 are provided on opposite sides of each storage cavity to guide the insertion and removal of a PC card into and from the storage cavity. Portions of the movable plate 2 are bent at right angles to form abutment tabs 2A for abutment with the front end face of a PC card 1. A U-shaped recess 2B extends forwardly from the rear edge of the movable plate 2 for receiving a stud 4 of the housing.

The eject lever 5 is pivoted to each stud 4 for rotation about the stud 4 and has a semi-circular action point 5A which is abutment with an acted point 2C of the movable plate 2. An end portion opposite to the action point 5A is bent downwardly and then upwardly in a J-shape to form a bent member 5B.

An intermediate bar 6 has an engaging notch 6A for engagement with the bent member 5B of the eject lever 5. Consequently, the rotation of the eject lever 5 about the stud 4 moves the intermediate bar 6 in the longitudinal direction along the rear section 7A of a guide 7. The front end portion of the intermediate bar 6 is bent at right angles and has an engaging aperture 6B therein.

In FIGS. 4 and 5, an operation opening is provided in front of the intermediate bar 6 for communication with the two storage cavities. An eject bar 8 is provided through the operation space. The intermediate bars 6 are provided in the same number as that of PC cards 1 but only a single eject bar 8 is provided. The single eject bar 8 can be switched to engage one of the two intermediate bars 6.

A slider 9 is provided in the front section 7B of the guide 7 for sliding movement in the longitudinal direction and biased forwardly by a spring 10 provided between a lock arm 7C and the slider 9. A step member 9A of the slider 9 abuts against a shoulder 7D of the guide 7 to restrict the forward movement of the slider 9.

A fine groove 9B is provided through the slider 9 in the longitudinal direction for receiving the eject bar 8 and an operation button 11. The rear and front ends of the eject bar 8 extend rearwardly from the fine groove 9B nearly to the front end of the intermediate bar 6 and the front opening of the fine groove 9B, respectively. The eject bar 8 is rotatably supported at a midpoint by a pin 12 which is attached to the slider 9. An engaging projection 8A provided at the front end of the ejector bar 8 is opposed to an engaging aperture 6B provided at the front end of the intermediate bar 6. A lock aperture 8B is provided near the front end of the eject bar 8 for engagement with a rounded projection 7E provided on a lock arm 7C of the guide 7.

The operation button 11 is rotatably supported by a pin 13 in the front opening of the slider 9. The operation button 11 and the eject bar 8 are rotatably coupled by a protruded member 14 to form an ejector.

In FIG. 4, when the operator turns the operation button 11 upwardly or downwardly, the rear end of eject bar 8 is moved downwardly or upwardly by the protruded member 14 and the position is locked by the engagement between the lock aperture 8B and the rounded projection 7E of the lock arm 7C. Then, when the operation button 11 is depressed or pushed rearwardly, the engagement between the lock aperture 8B and the rounded projection 7E is released to permit advancement of the eject bar 8. Then, the front projection 8A engages the engaging aperture 6B of the intermediate bar to assure advancement of the intermediate bar 6.

Alternatively, a lock aperture 8B may be formed midway in the eject bar 8 while a lock projection is formed on the slider 9 for engagement with the lock aperture of the eject bar 8. Similarly, the eject bar 8 may be made to engage the operation button.

Such a case, when the operation button is pushed rearwardly, it advances the intermediate bar without release of the engagement with the eject bar 8 to assure engagement with the engaging aperture 6B of the intermediate bar 6.

How to use the PC card electrical connector will be described below.

(1) A desired PC card is inserted into a predetermined storage cavity in the same manner as the conventional connectors.

(2) If one of the PC cards inserted in the upper and lower storage cavities, the operation button 11 is turned to the position corresponding to the intended PC card. If the upper PC card is to be removed, the operation button 11 is turned upwardly as shown in FIG. 4.

(3) Consequently, the eject bar 8 is turned about the pin 12 counterclockwise to move the rear end upwardly so that the engaging projection 8A is opposed to the engaging aperture 6B of the upper intermediate bar 6.

Figure 6:
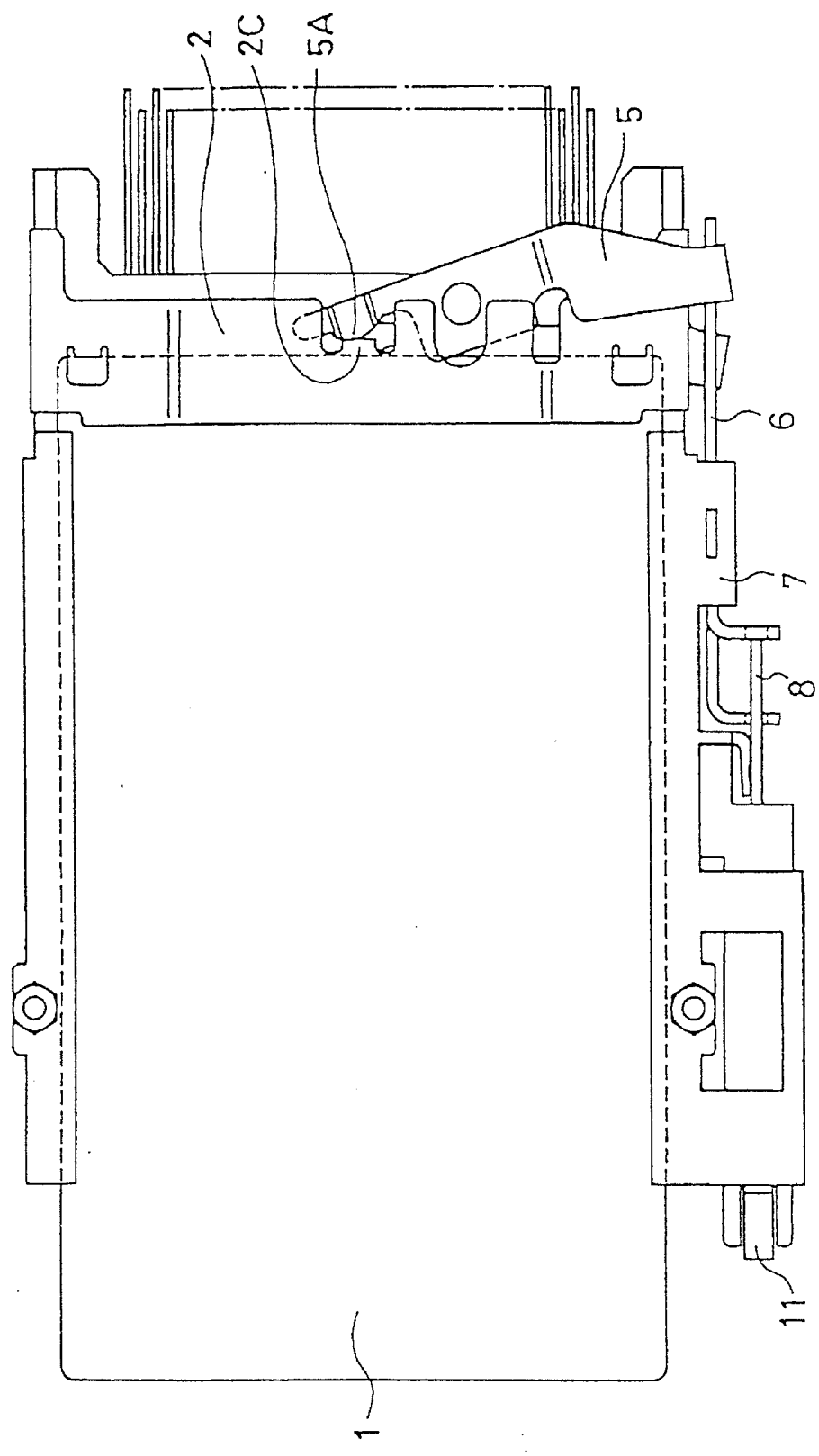
FIG. 6 is a top view of the electrical connector wherein a PC card is being removed.
Figure 7:
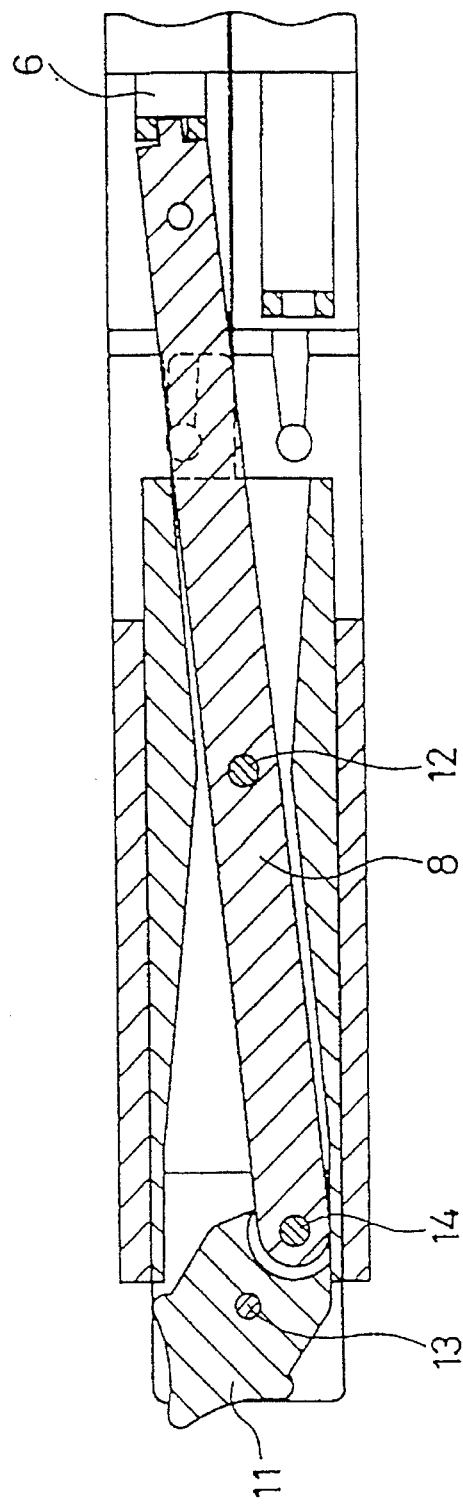
FIG. 7 is a sectional view corresponding to FIG. 4 wherein the eject bar is depressed.
Figure 8:
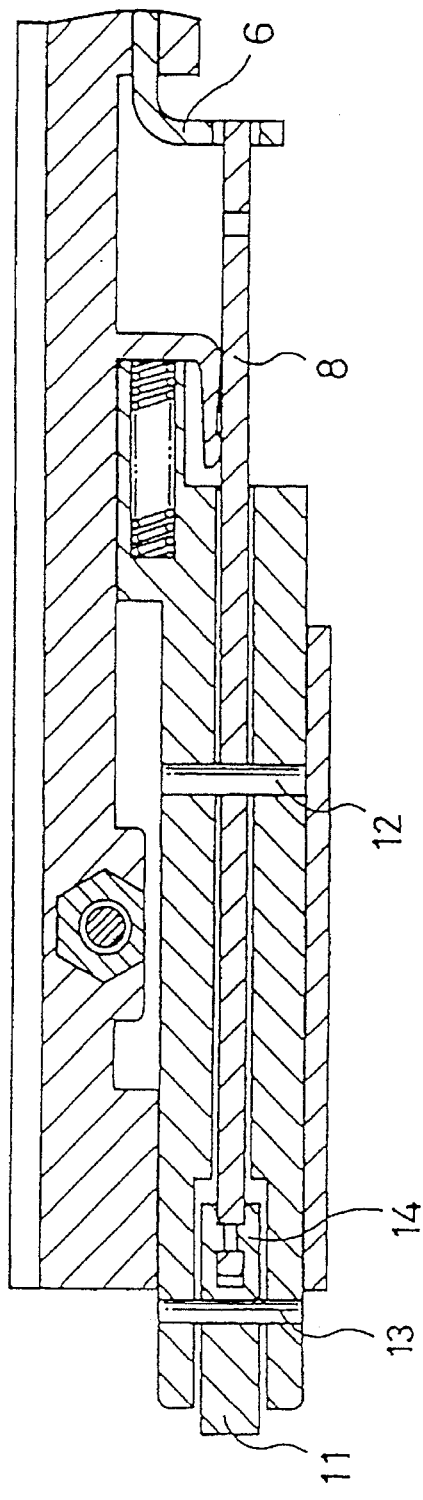
FIG. 8 is a sectional view corresponding to FIG. 5 wherein the eject bar is depressed.

(4) Then, when the operation button 11 is pushed rearwardly, the force moves rearwardly the eject bar 8 and the intermediate bar 6 together with the slider 9 (see FIGS. 6–8) so that the intermediate bar 6 turns the eject lever 5 about the stud 4. Then, the action point 5A of the eject lever 5 pushes the acted point 2C of the movable plate 2 forwardly, bringing the PC card forwardly so that a large rear portion of the PC card projects from the storage cavity. Thus, the operator can remove the PC card by hands. When the force upon the operation button 11 is removed, the spring 10 brings the eject bar 8 and the operation button 11 together with the slider 9 to the initial position in preparation for the next operation.

Figure 9:
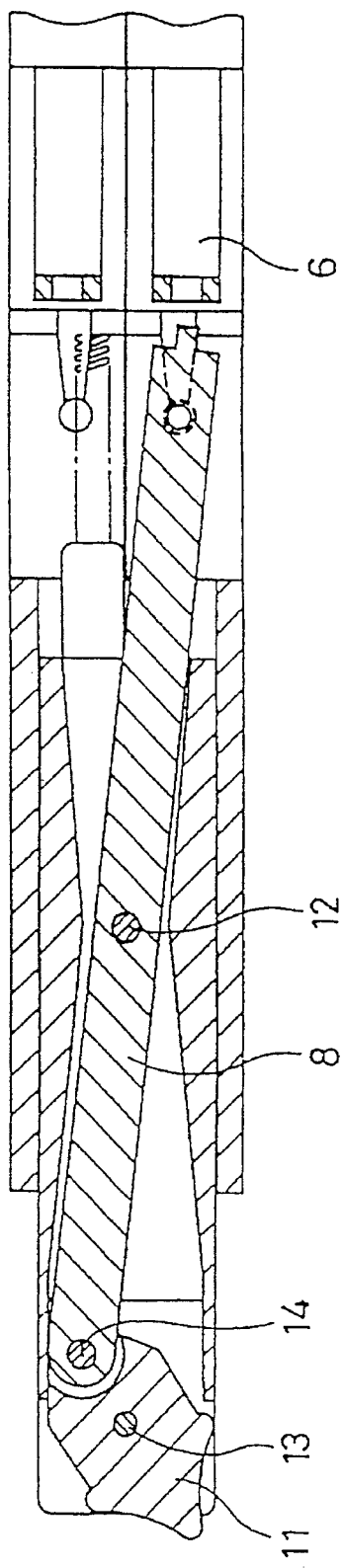
FIG. 9 is a sectional view corresponding to FIG. 4 wherein the eject bar is switched.
Figure 10:
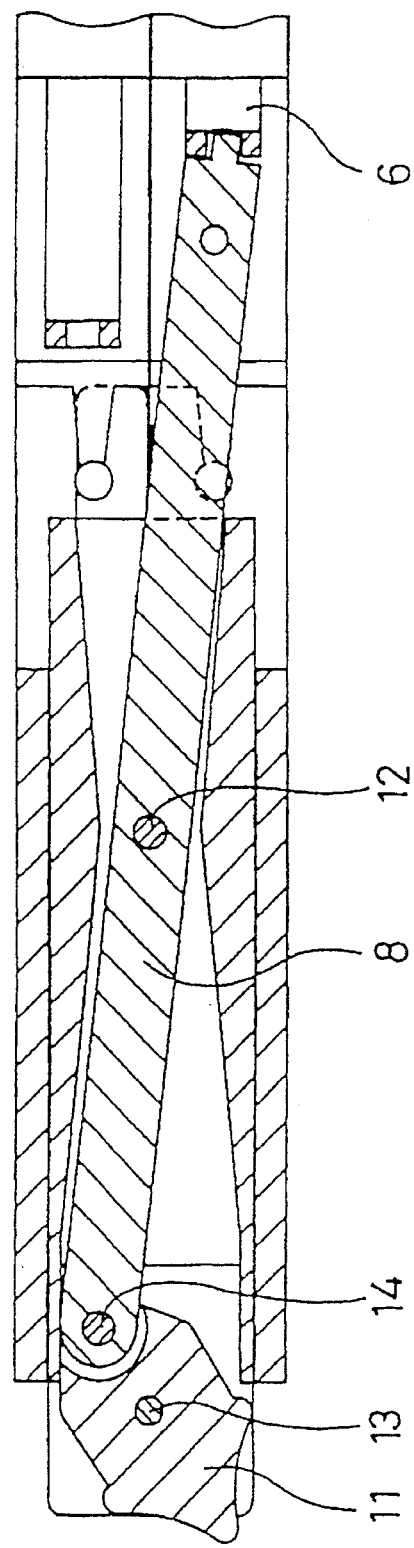
FIG. 10 is a sectional view similar to FIG. 9, wherein the eject bar is depressed.
Figure 11:
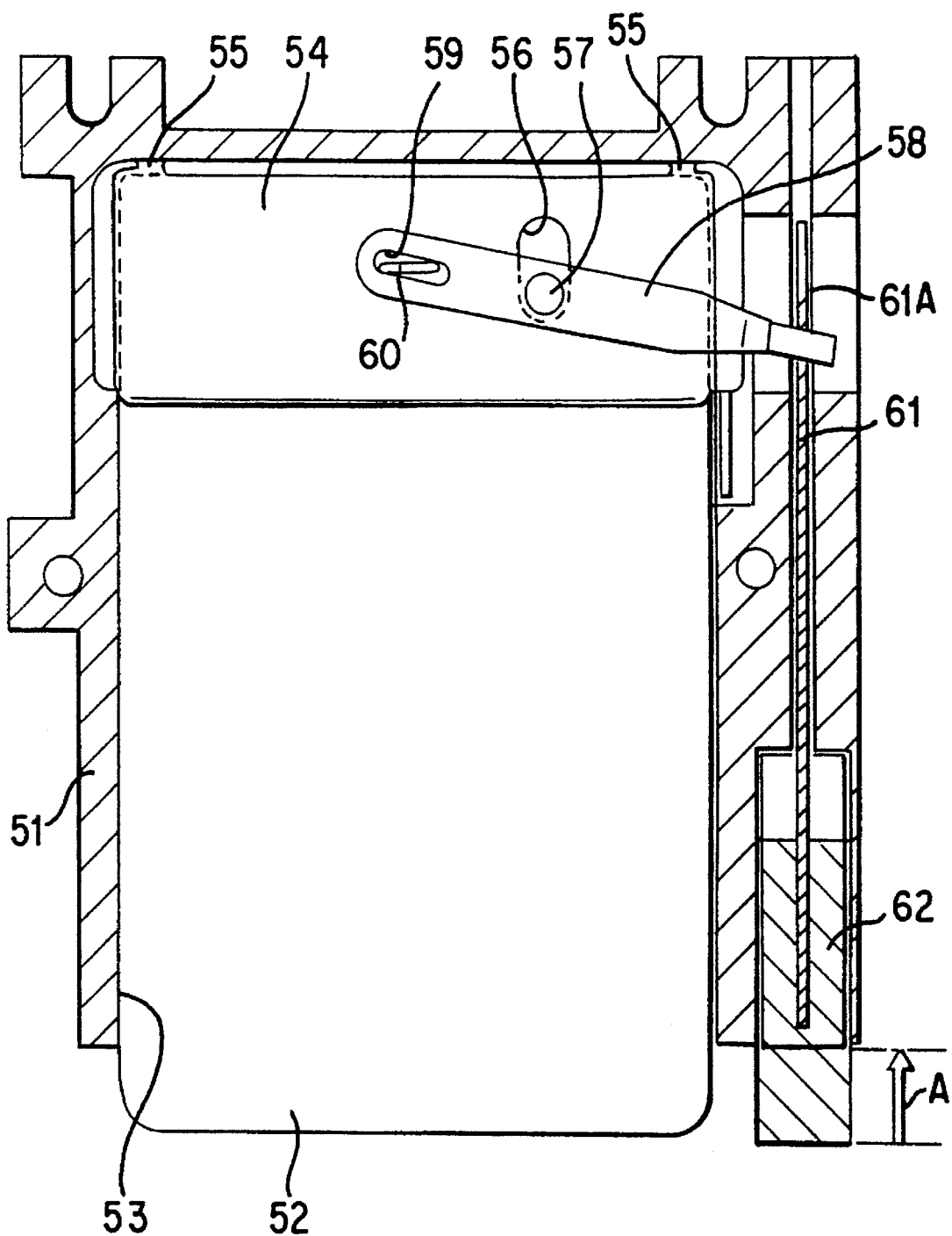
FIG. 11 is a partially sectional view of a conventional electrical connector.

(5) If the lower PC card is to be removed, the operation button 11 is turned downwardly as shown in FIG. 9 so that the front end of the eject bar 8 is opposed to the lower intermediate bar 6 for the lower PC card. Then the operation button 11 is pushed rearwardly as shown in FIG. 10 for removal of the lower PC card in the same manner as the above paragraph (4).

The invention is not limited to the connectors for two PC cards but is applicable to connectors for three or more PC cards. In such a case, it is necessary to design such that the eject bar 8 can stop at a rotational position corresponding to each PC card. It preferred to provide a lock for maintaining the rotational position more than in the case of the connectors for two PC cards.

Alternatively, the operation button may be omitted by handling the rear end of the eject bar directly. In this case, it is preferred to provide a mark indicating which PC card is being ejected because the up and down positions are opposite on the front and rear ends of the eject bar.

As described above, according to the invention, by switching the position of the single eject bar, it is possible to operate any of the several eject levers in a connectors for a few PC cards, thus providing a sufficient space around the operation button for easy operations with few errors such as depressing the adjacent operation buttons. Since only a single eject bar is used, the ejector structure is made simple.

I claim:

1. A PC card electrical connector comprising:

a housing having at least upper and lower storage cavities for accepting PC cards one for each storage cavity;

at least upper and lower movable plates disposed near said upper and lower storage cavities, respectively, and each having at least one abutment member for abutment with a portion of said PC cards;

at least upper and lower eject levers rotatably supported by said housing in planes parallel to said PC cards and coupled at one end to said movable plates;

at least upper and lower intermediate bars coupled to the other end of said upper and lower eject levers, respectively, and movable along sides of said storage cavities; and ejector means for selectively engaging one of said upper and lower intermediate bars, said ejector means including a single eject bar having an end switchable so that another end is selectively engaged with one of said intermediate bars to eject a desired PC card with ease and few errors.

2. A PC card electrical connector according to claim 1, wherein said ejector means comprises lock means for maintaining a selected rotational position of said eject bar which corresponds to a position of another end of said eject lever.

3. A PC car electrical connector according to claim 2, wherein said lock means comprises a lock aperture provided at rear and portion of said eject bar and a rounded projection of said housing.

4. A PC card electrical connector according to claim 1, wherein said ejector means comprises a slider for rotatably supporting said single eject bar such that one end of said eject bar selectively engages one of said intermediate bars, thereby permitting selective removal of one of said PC cards.

5. A PC card electrical connector according to claim 4, wherein said ejector means comprises lock means for maintaining a selected rotational position of said eject bar which corresponds to a position of another end of said eject lever.

6. A PC card electrical connector according to claim 1, wherein said ejector means comprises an operation button rotatably coupled to a front end of said eject bar so that by operating said operation button it is possible to select one of said intermediate bars through said single eject bar, thereby permitting removal of said desired PC card.

7. A PC card electrical connector according to claim 6, wherein said ejector means comprises lock means for maintaining a selected rotational position of said eject bar which corresponds to a position of another end of said eject lever.

* * * * *